[11] 3,623,798

[72] Inventor Nicholas K. Sheridon
Clarkes Crossing, N.Y.
[21] Appl. No. 4,648
[22] Filed Jan. 21, 1970
[45] Patented Nov. 30, 1971
[73] Assignee Xerox Corporation
Rochester, N.Y.

[54] BLAZED HOLOGRAM FABRICATION
30 Claims, 3 Drawing Figs.
[52] U.S. Cl. .................................... 350/3.5,
161/3.5, 350/162 SF
[51] Int. Cl. .................................... G02b 27/22,
B44f 1/04
[50] Field of Search ............................ 350/3.5,
162 SF

[56] References Cited
UNITED STATES PATENTS
3,519,323  7/1970  Collier et al. ................ 350/3.5

OTHER REFERENCES
Leith et al., J. Opt. Soc'y Am., Vol. 56, No. 4 p. 523 (4/1966)
Sheridon, Applied Physics Letters, Vol. 12, No. 9, pp. 316-318 (5/1968)

*Primary Examiner*—David Schonberg
*Assistant Examiner*—Robert L. Sherman
*Attorneys*—David C. Petre, Michael H. Shanahan and James J. Ralabate

ABSTRACT: Production of a modified blazed hologram is disclosed that will exhibit a single-wavelength image when illuminated by a white, i.e., multiwavelength light source. One embodiment includes coating a sheet of ground glass on the ground side thereof with a photoresist material. This photoresist is exposed in the presence of object and reference coherent light waveforms and subsequently developed. Blazed fringes will form on the irregular surface thereof. When reilluminated with a light beam similar in form and wavelength to the reference beam, the positive first order image is reconstructed without distortion. Images of different orders will appear randomly diffused as will other wavelengths.

PATENTED NOV 30 1971 3,623,798

INVENTOR.
NICHOLAS K. SHERIDON
BY Franklyn C. Weiss
ATTORNEY

BLAZED HOLOGRAM FABRICATION

BACKGROUND

Prior art imaging techniques include that of holography which, through special exposure techniques on a photosensitive layer such as a photographic film, produces an image recording which, when reilluminated with a similar coherent light source, gives a three-dimensional image to a viewer. A hologram may be made, for example, by directing a portion of radiation from a laser source or other source of coherent radiation at or through an object to be holographed and providing a separate portion of the radiation, called a reference beam, by various mirror and/or lens arrangements, or otherwise providing for a separate beam that is coherent with the beam of light illuminating the object, and then positioning the image member, typically photographic film so that it receives both the object-modulated radiation and the reference beam. The film will then record the intensity of the sum of the two fields, i.e., will record the stationary interference pattern between the two fields. Subsequently, the interference pattern developed upon the recording surface may be utilized in reconstruction of the object modulated wave front, typically to produce a viewable image of the object by suitably directing a beam similar to the reference beam at the hologram.

Most prior art holograms are constructed with the object and reference beams impinging upon the holographic plate from the same side of the plate. A hologram produced by directing the object-modulated beam and the reference beam through opposite sides of the photosensitive layer was first described by Denisyuk in Soviet Physics-Doklady, No. 7, Page 543 (1962). This hologram consists of recorded interference patterns which are nearly parallel surfaces and which are approximately one-half wavelength of the light apart and which are typically nearly parallel to the surfaces of the photosensitive layer. The wave fronts from which an image of the holographed object can be formed are reconstructed by passing an illumination beam similar to the reference beam through the hologram. The present applicant in copending application Ser. No. 728,986, filed May 14, 1968, improved upon Denisyuk's technique by providing a photohardenable imaging member, imaging a standing optical wavefield in and on said photosensitive member and developing the exposed member to preferentially dissolve either relatively exposed or unexposed portions of the member (depending on the type of photohardenable material used) to produce a surface relief holographic recording.

Although any suitable optical system capable of producing the blazed, surface relief hologram construction disclosed in said copending application may be employed, the preferred mode being to allow the object modulated beam to interfere, interact and combine with a reference beam propagating in a direction so that the vector direction of the reference beam forms an angle between about 90° and about 180° with substantially all of the directional vectors of the object beam, with the object-modulated beam and the reference beam directed at opposite sides of the photohardenable member. In this preferred mode of construction exposure, of course, both sides of typical photohardenable layer must be permeable to exposure radiation and this is typically provided by coating a layer of photohardenable material on a transparent substrate.

Both prior art holograms and applicant's prior invention of blazed holograms must normally be reconstructed with a similar but not necessarily the same coherent light illumination wavelength. The present inventor, in continually reviewing his technique of blazed holograms, has found that by the technique to be more fully hereinafter described, a blazed hologram can be produced which is readily replicated, and the image thereon may be reconstructed by any multiwavelength light source.

OBJECTS OF THE INVENTION

It is, accordingly, an object of the present invention to provide a holographic imaging system capable of producing a blazed holographic surface relief recording which is only responsive to light illumination contained within a narrow band of wavelengths.

It is another object of the present invention to increase the efficiency of recording information in a blazed holographic recording system.

It is another object of the present invention to provide an easily replicable blazed holographic recording medium responsive to only one or more specific reconstruction wavelengths.

BRIEF SUMMARY OF THE INVENTION

In accomplishing the above and other desired aspects of the present invention, applicant has invented improved apparatus and methods for blazed holographic information recording. By coating the ground side of a ground glass substrate with a photoresist material, and exposing said photoresist material through opposite sides of the ground glass with object and reference coherent light waveforms, a blazed interference pattern will be formed on the irregular surface thereof. When reilluminated with a light beam similar in form and wavelength to the reference beam, one first order image will be reconstructed without distortion. The other images will appear randomly diffused, as will any other wavelength applied thereto. The invention may be extended to the exposure of the photoresist with a plurality of different frequency coherent light sources or through a plurality of filters to produce an output color image upon reconstruction by the same wavelength illumination or by a multiwavelength or white light source.

BRIEF DESCRIPTION OF THE DRAWINGS

For a better understanding of the invention as well as other objects and further features thereof, reference is made to the following detailed description taken in conjunction with the accompanying drawings wherein.

DETAILED DESCRIPTION OF THE INVENTION

Figure 1:
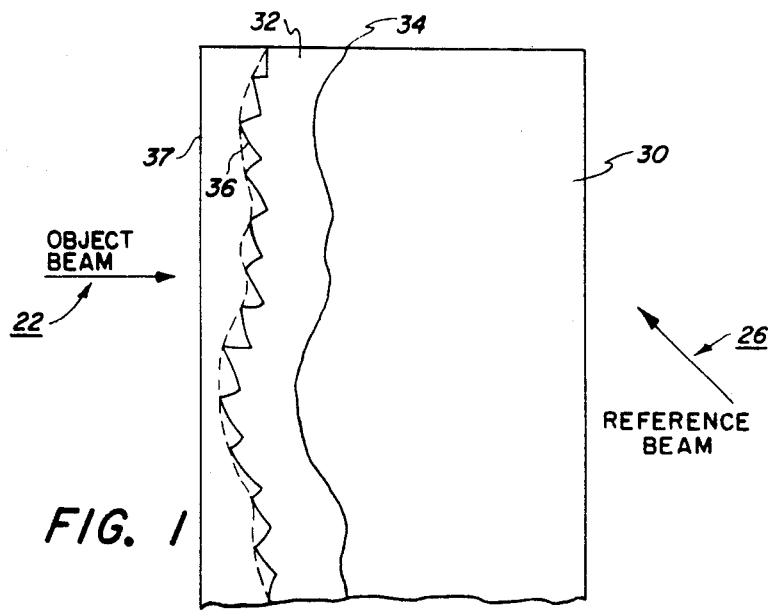
FIG. 1 is a partly schematic, partly side sectional view of the ground glass substrate with the photohardenable material thereon showing the original surface and the blazed surface subsequent to exposure.

As hereinabove set forth, Yu N. Denisyuk introduced the concept of a hologram produced by exposing a thick photographic emulsion to a standing optical wavefield. The standing optical wavefield was created by allowing light reflected from an object to interfere with a reference beam propagating in an opposite direction. The photographic emulsion recorded the antinodal surfaces of the wavefield as silver deposits in the emulsion volume. These silver deposits served as reflection surfaces for the reconstruction of the object wavefield.

In Applied Physics Letters, Volume 12, No. 9, May 1, 1968, pages 316 to 318, the present inventor pointed out that adjacent standing wave surfaces are about one-half wavelength apart and are nearly identical in shape. It may then be expected that boundary conditions equivalent to a single isolated standing wave surface can be obtained by isolating the fragments of standing wave surfaces located in the volume of space between two parallel planes spaced approximately one-half wavelength apart. Such a hologram is in effect blazed, and like a blazed diffraction grating, reflects a maximum amount of light into a single diffraction order. Its groove shape follows sections of the standing wave surfaces as is shown schematically in said copending application, Ser. No. 728,986, in the name of the present inventor and assigned to the same assignee as the present application.

This copending patent application disclosed that blazed holograms can be produced by exposing a thin, high resolution photoresist layer coated on glass. The development process for photoresist materials involves the preferential dissolution of either exposed or unexposed portions, depending on the type of photoresist material used, in the developer liquid. Hence, only the standing wave surfaces in the outer half wavelength thick layer of the photoresist are isolated. Dissolution to a greater depth is prevented by the insolubility of the already isolated standing wave surfaces.

Further said copending application discloses that when coated with aluminum, the collimated beam holograms behave like good blazed diffraction gratings. For 4,880 angstrom light (the same as used in the exposure), they diffract at least 73 percent of the reflected light into the +1 order, 26 percent into the 0 order and less than 1 percent into the −1 order.

The present application describes a modified blazed hologram that produces a single-wavelength image when illuminated by a multiwavelength light source, or that will produce a multicolor image when illuminated by a multiwavelength light source. This is done without the use of filters or other color filtering or selection devices, as is hereinafter more fully described. Like other blazed holograms, these holograms have surface relief information only and may be replicated by mechanical means.

The present inventor has observed blazed holograms made and developed in such a manner that a great deal of random surface relief (noise) is superimposed on the information recorded on the hologram surface. When illuminated with white light, these holograms randomly disperse (i.e., behave like a ground glass screen) all colors except that color characteristic of the laser used to make them. They reconstruct a low-noise image with this color and still behave like good blazed holograms in the sense that most of the diffracted light appears in the positive first order image.

Single-wavelength selection blazed holograms can be made in a manner exactly similar to that used to produce blazed holograms, with the following exceptions. Instead of isolating the fragments of standing wave surfaces located in the volume of space between two parallel plane surfaces approximately one-half wavelength apart, the fragments of standing wave surfaces located in the volume of space between two nearly identical randomly relieved surfaces approximately one-half wavelength apart are isolated. Furthermore, the materials on either side of this recording volume and bounded on one side by a surface of this recording volume and on another side by a plane, spherical or at least nonrandomly relieved surface through which light is entrant for exposure must be of the same or nearly the same refractive index for the exposing light as is the photosensitive material of the recording volume. After exposure the refractive index matching material is removed from one surface of the photosensitive material and the blazed fringes are isolated by suitable development. These are then usually coated with a highly reflective material such as aluminum to obtain high-reconstruction efficiencies.

When illuminated with white light through the plane or spherical or at least nonrandomly relieved surface of the material supporting that upon which the blazed fringes are recorded, only light of wavelength equal or nearly equal to that used to originally record the hologram will reconstruct a wave front similar to that used to form the hologram. The remaining light will be randomly diffused. Hence, the image produced by such a hologram illuminated with white light will appear in only that wavelength used to make the hologram.

The wavelength selective property of single wavelength selective holograms is due to the unique boundary condition imposed by the randomly relieved surface upon which the blazed fringes are recorded. The phase of light reflected from a blazed surface is determined primarily by the shape and positions of the fringe surfaces. Hence, light reflected from blazed fringes on a "hill" of the randomly relieved recording surface will be exactly in phase with light reflected from a nearby "valley" only for the wavelength used to form the blazed surface. The greater the heights of the hills and depths of the valleys and the more frequent their occurrence the greater will be the phase mismatches suffered by other wavelengths of light, and hence the more narrow will be the bandwidth of the light capable of reconstructing an image from such a surface. A wavelength of light suffering large phase mismatches on such a surface will be randomly diffused and cannot form an image. For such wavelengths the surface will act like a piece of ground glass.

A single-wavelength selective blazed hologram is believed to reconstruct with a far narrower bandwidth of light than could be the case with any other type of surface relief hologram. Other types of surface relief holograms record wave front information by means of interference fringes having sinusoidal or quasi-sinusoidal surface cross sections. These are recorded in a geometry in which both reference beam light and light from the object are incident on the same side of the recording surface. If the recording surface has a randomly relieved surface the resultant hologram will have wavelength selective properties. This hologram will not be as wavelength selective as would be the case for a blazed hologram recorded on the same surface, however, since with this hologram the phase of the reflected (or transmitted) light is not determined by the shapes of the interference fringes but only by their distribution. This allows for some ambiguity of the phase of the reflected (or transmitted) light and hence permits a broader bandwidth of light to reconstruct an image. This type of hologram further differs from the single wavelength selective blazed hologram in that it is not necessary for the material adjacent to the photosensitive surface to have the same refractive index as the photosensitive surface.

Single-wavelength selective blazed holograms can be made by superimposing a phase type random noise pattern on or adjacent to the phototsensitive material used to make these holograms. The following discussion shows the various embodiments of the present invention used to produce the single-wavelength selective blazed holograms.

FIG. 1 shows a support member or substrate 30 with a randomly varying surface 34 as would exist on a high-quality ground glass screen. On the surface of the ground glass 30 is a thin layer of a photoresist 32 which would conform almost exactly to the random surface 34 of ground glass 30. Covering the surface of the photoresist 32 is a material 37 having the same index of refraction for the exposing light and having a flat or spherical or at least nonrandomly relieved surface. This material 37 will be removed prior to development of photoresist 32. The ground glass and the photoresist also have the same index of refraction for the exposing light, and one surface of the ground glass is flat, spherical or at least nonrandomly relieved.

After exposure by object beam 22 and reference beam 26, to be more fully hereinafter described in conjunction with FIG. 2, the blazed fringe 36 will form upon development on the irregular surface of the coating 32. When reilluminated with a light beam similar in form and wavelength to the reference beam 26, the positive first order image will be reconstructed without distortion. The other images will appear randomly diffused, while any other wavelength will be also randomly diffused.

Figure 2:
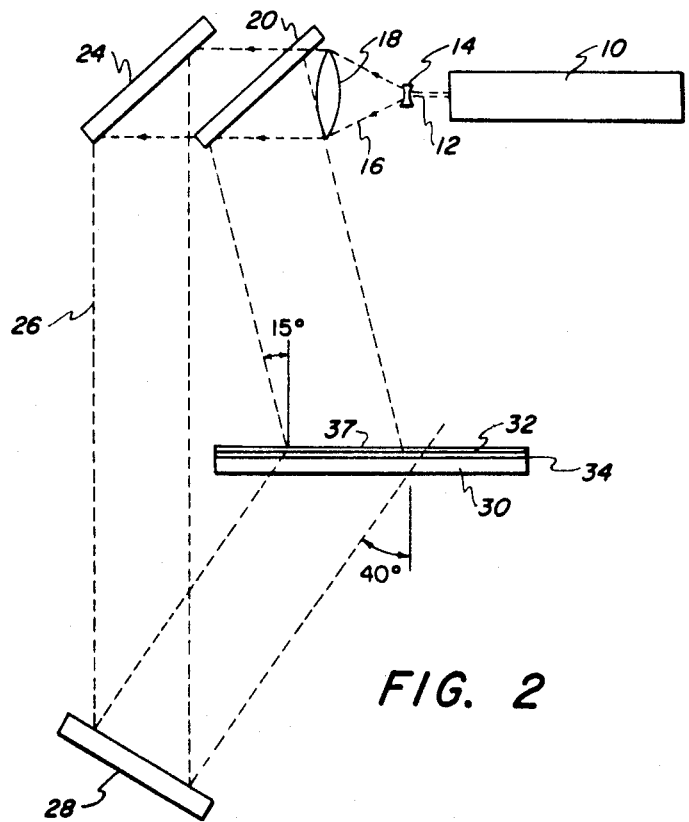
FIG. 2 is a schematic drawing of the apparatus utilized in constructing the blazed hologram of FIG. 1.

FIG. 2 shows the blazed holographic surface 30 in conjunction with the apparatus utilized to construct the blazed hologram. A coherent light source 10 is directed through diverging lens 14, collimating lens 18 and beam splitter 20 to create two beams of coherent radiation, a first beam 26 reflected by mirrors 24 and 28 to the glass plate side of the hologram and a second beam 22 reflected by beam splitter 20 to the coating 32 side of the hologram. The second beam, a collimated beam of light, intersects the photoresist surface 32 at a predetermined angle of, say, 15° to the normal of the plate. The first beam 26, another collimated beam of light, intersects the glass surface 30 making an angle of, for example, 40° to the normal of the plate.

The photoresist 32 is exposed continuously to these light beams until a sufficient light energy is received to allow for sufficient developing, thereby rendering a blazed surface 36 as seen in FIG. 1. The surface of the blazed hologram now consists of segments of the interference pattern present in the photoresist during exposure but now on a random surface 34 of the ground glass surface 30.

Many photoresist or photohardenable materials may be used for the coating 32 so long as the properties are matched with the hardening or softening radiation of the particular coherent light source chosen. Many such examples are set forth in said copending application Ser. No. 728,986, and reference is made hereto, but an example of such a photoresist is that purchaseable from the Shipley Company, Inc. and known as the Shipley AZ1350 photoresist. After exposure utilizing the aforementioned photoresist, the hologram may be immersed in AZ1350 developer also available from the Shipley Company, Inc. As is fully set forth in the copending application Ser. No. 728,986, the photoresist would be exposed continuously to the light beams as shown in FIG. 2 until a total light energy of about 2 joules per square centimeter is received. Developing would take place for about 20 seconds. The hologram plate would then be immediately immersed in distilled water for about 5 seconds and then the surface is dried with a burst of compressed air. The photoresist surface is then vacuum coated with a nearly opaque layer of highly reflecting aluminum, or other suitably reflective metal.

Upon reconstruction, a second beam of coherent light 40 would be diverged by diverging lens 42 and collimated by collimating lens 44 onto the mirror surface 46. If the object and reference waveforms were at the angles set forth above in conjunction with FIG. 2, the direction of light diffracted into the 0 order would be at 15° from the normal of the surface 32 of the hologram 30. The +1 order of the light diffracted would be reflected at an angle of 40° from the same holographic surface.

The coating 32 on substrate 30 could also be a finely ground transparent material which is mixed with a photoresist to form a slurry, a thin layer of which is coated on the transparent substrate 30. The finely ground transparent material causes a random surface as would exist on a ground glass and thus the coating herein could be used as set forth above for the ground glass surface. However, a blazed hologram used with a ground glass surface may easily be replicated by known mechanical principles, but the use of the finely ground transparent material cannot as easily be replicated unless such ground material has the same refractive index as the substrate 30.

A further example of the coating 32 is wherein a positive working photoresist material is coated on a transparent sheet of glass and exposed to highly diffuse ultraviolet light. The ultraviolet light will be strongly absorbed, penetrating only a short distance into the photoresist. After development the photoresist surface will be highly diffusing. With such a diffuse coating thereon, the surface may now be utilized to record a blazed hologram as set forth above with said ground glass surface. Alternatively, the photoresist may be exposed to record blazed fringes immediately after exposure to the diffuse ultraviolet light and without intermediate development. The ultraviolet light exposed portion of the photoresist would then function as the material 37.

The material 37 may be a liquid contained in a bath or cell having the same refractive index as the photoresist and easily removed from the surface of the photoresist after exposure. It may also be a material such as a transparent wax removed by heat, or a transparent plastic removed by solvents or removed by peeling it from the photoresist surface due to its poor adhesion to the photoresist.

Such a blazed hologram on the random surface substrate, leads to many applications thereof which are easily replicated due to the fact that the information is on the surface rather than internally as would be a normal photographic hologram. For instance, such a blazed hologram as set forth herein may be utilized as a color filter where a simple blazed hologram made from two or more parallel or quasi-parallel light beams will reflect or transmit illumination without randomly diffusing only the light contained in a narrow bandwidth about the wavelength used to initially make the hologram.

Figure 3:
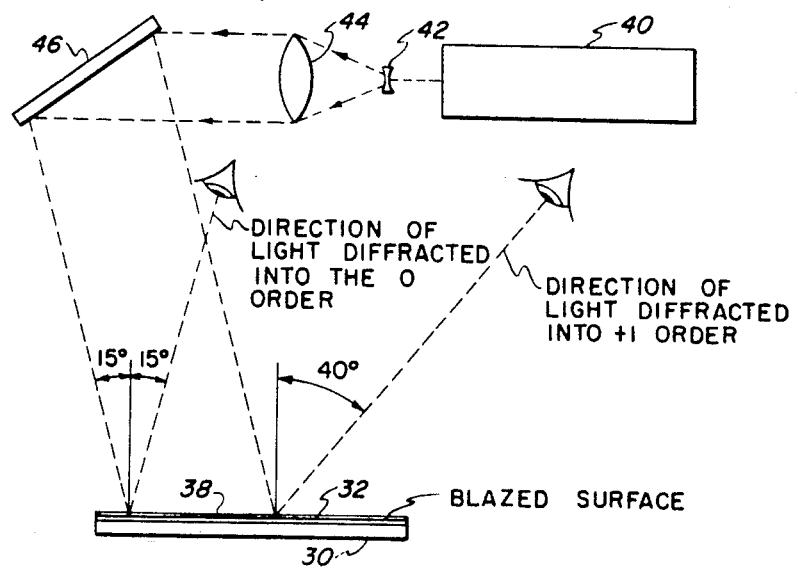
FIG. 3 shows the reconstruction apparatus utilized in reconstructing the image of the blazed hologram.

To reconstruct the hologram light may be allowed to enter the smooth surface of the ground glass and reflect from the blazed surface. Alternatively, light may be allowed to reflect from the blazed surface from the opposite side, as in FIG. 3, but this side must first be coated with a material 38 having the same refractive index as the material 37 had and similarly having a flat, spherical or at least nonrandomly relieved surface.

Due to the fact that the present invention produces a blazed hologram which is responsive only to light within a narrow frequency or wavelength band, the reconstructing illumination need not be as coherent as would be required for a normal blazed hologram. Utilizing this principle a color hologram can be produced, wherein the recording material is partially obscured on both sides by identical and registered regular or random arrays of opaque masks while exposed sequentially to each of the two, three or more wavelengths of coherent light used to form the complete color image. A different set of masks would be used for each recording wavelength or, if desired, the same mask for each side shifted to a different position for each wavelength exposure. Normally these masks would be nonoverlapping so each region of the recording material would be exposed to one and only one recording wavelength. However, some overlap could be tolerated. It is to be understood that identical and registered masks are used on each side of the recording plate so that each region of the recording material will be exposed to the same wavelength of light coming from the object and coming from the reference beam.

As a second but less preferred embodiment no explicit masking would be used if a hologram of a diffusely illuminated or self-diffusing object were to be made. Here advantage would be taken of the fact that for each recording wavelength, the intensity of the light wavefield (light from the object plus reference beam) will vary in a random fashion, regions of it being insufficient to properly expose the photosensitive material of the recording surface. However, the light intensity of another recording wavelength might be quite adequate to expose this region of photosensitive material. The recording surface would be exposed to the recording wavelengths either simultaneously or sequentially. In this manner randomly distributed regions of the hologram would reconstruct an image in only one color. Other regions would, of course, have been exposed to the two or more wavelengths having high intensity and in these regions the proper fringe structure for no wavelengths will be developed and these regions will not contribute useful light to the reconstructed image. The consequent loss of efficiency, however, might be well compensated by the greater convenience afforded by not requiring the manipulations of masks.

As a third embodiment, the randomly structured photosensitive recording surface would be made up of a regular or random array of patches of as many different photosensitive materials as recording wavelengths. Each type of material would be sensitive to only one of the recording wavelengths. The recording surface might be exposed to the recording wavelengths either simultaneously or sequentially. In this manner regions of the hologram would reconstruct an image in only one color.

As a fourth embodiment the recording material would be masked on both sides with identical random or regular arrays of optical filters placed adjacent to it with as many types of optical filters as recording wavelengths and with each type of optical filter able to pass only one recording wavelength. In this manner regions of the hologram would reconstruct an image in only one color. One of the arrays of masks might be left in place adjacent to the hologram during reconstruction so that some of the unused portion of the white light used to reconstruct the hologram would be absorbed or reflected depending upon the type of color filter used, before reaching the hologram. This light would not then contribute to the randomly diffused white light background of the reconstructed image, and the reconstructed image would then be enhanced. Many types of optical filters would be suitable for this embodiment, such as multilayer reflective filters or colored transparent absorptive filters. An example of the latter might be an array of glass or plastic discs bonded together.

In the above embodiments the color hologram of a multicolored object is produced by illuminating the object with each of two or more recording wavelengths used sequentially or simultaneously as indicated in each of the above embodiments. Light of a given color from the object is allowed to fall on the recording material while simultaneously a reference beam of the same wavelength illuminates the recording material in the previously described proper manner. It is commonly true that the reference beam used in holography emanates from a real or virtual point source. The reference beam point sources for all recording wavelengths must occupy identical or nearly identical positions in space relative to the recording material. For simultaneous exposure this may be accomplished, for example, by means of mirrors.

To reconstruct a multicolored image from this type of hologram a white light point source will ideally be used which occupies the same position in space relative to the hologram as did the reference beam point sources. Then, due to the fact that each region of the hologram is responsive to only one narrow band of wavelengths or frequencies, and due to the fact that two or more narrow wavelength bands are each represented by a plurality of such regions distributed through the hologram, a multicolored image will result from this white light illumination.

The above list of embodiments is meant to serve as an example of how multicolor blazed holograms may be made on random surface substrate photosensitive materials. Similar embodiments and combinations of the above embodiments, such as might occur to one skilled in the art, are also meant to be covered in this application.

In addition, the blazed hologram on the ground glass surface can be utilized as a sophisticated spectroscopic diffraction grating. By making the photoresist-substrate material sufficiently diffusing, it would be possible to make a wavelength filter with an extremely narrow band pass.

A hologram made with a multiplicity of such narrow band pass filters, one for each of some of the principal spectral lines of an element or compound, could quickly determine the presence of such an element or compound when used in place of a conventional diffraction grating in a spectroscopic apparatus. One embodiment of this concept would be to construct such a hologram having narrow band-pass filters characteristic of emission lines of many elements or compounds. Filters for such a single element or compound could, for example, focus their light onto a given light measuring device such as a photodiode or photomultiplier. With an array of such light measuring devices suitably calibrated, one for each element or compound in question, the relative abundance of each of these could be rapidly determined by the corresponding measured light intensity. Such a device might be constructed with present art using a multiplicity of multilayer interference filters and lenses. Such filters are very expensive, however, making the economic feasibility of such a device questionable. However, the collection of holographic filters described above can be so inexpensively replicated that such a device made in such a way need not be costly.

In the foregoing there has been disclosed methods and apparatus for effectively utilizing holographic principles in the construction of a blazed hologram responsive only to a single light wavelength. In the specification herein, specific angles and materials have been discussed with regard to the makeup of the holographic surface, but it is obvious that such articles and materials could change in accordance with the coherent light radiation and the materials available. Therefore, while the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. An imaging method comprising the steps of:
   a. directing an object modulated beam of coherent radiation at one face of a thin photohardenable layer having a randomly varying surface;
   b. directing a reference beam of coherent radiation, in phase with the coherent radiation of said object modulated beam, at the other face of said layer to create a standing wave interference pattern in and at one face of said layer to create a corresponding change in and at said face of said layer in resistance to a solvent, and
   c. subjecting said photohardenable layer on said substrate to a solvent for the relatively less hardened portions of said layer to create a blazed surface on said layer.

2. The imaging method of claim 1 wherein the object modulated beam is a collimated beam.

3. The imaging method of claim 2 wherein the reference beam is a collimated beam.

4. The imaging method according to claim 1 including the additional step of depositing a thin layer of reflective material over and in conformance with said blazed surface.

5. The method of claim 1 in which said photohardenable layer is formed by applying a thin coating thereof to an irregular surfaced substrate.

6. An imaging method according to claim 4 wherein said reflective surface comprises a reflective metal which is deposited on said blazed photohardenable layer surface by vacuum evaporation.

7. The blazed surface product of the method of claim 1.

8. The blazed surface product of the method of claim 3.

9. A method of reconstructing a hologram produced according to claim 1 comprising the step:
   a. directing a reconstruction beam of coherent radiation at substantially the same direction relative to the blazed surface as the direction of the image construction reference beam relative to the photohardenable layer.

10. The method according to claim 9 wherein the reconstruction beam is similar in wavelength and wave front curvature to the image construction reference beam.

11. A method of reconstructing a hologram produced according to claim 3 comprising the step of:
    a. directing a reconstruction beam of coherent radiation at substantially the same direction relative to the blazed surface as the direction of the image construction reference beam relative to the photohardenable layer.

12. The method according to claim 11 wherein the reconstruction beam is similar in wavelength and wave front curvature to the image construction reference beam.

13. A reconstruction image method comprising the steps of:
    a. coating a photohardenable layer on a randomly varying surface, said layer forming an irregular surface conforming to the randomly varying surface upon which it is coated;
    b. directing an object modulated beam of coherent radiation at one face of said layer;
    c. directing a reference beam of coherent radiation, in phase with the coherent radiation of said object modulated beam, at the other face of said layer to create a standing wave pattern in and at the exposed face of said layer to create a corresponding change in and at the exposed face of said layer in resistance to a solvent;
    d. subjecting said exposed face of said layer to a solvent for the relatively less hardened portions of said layer to create a blazed photohardenable layer surface; and e. directing a reconstruction beam of coherent radiation at substantially the same direction relative to the blazed photohardenable layer as the direction of the reference beam in step (c) above is relative to the photohardenable layer.

14. The method according to claim 13 wherein said reconstruction beam is of substantially the same spectral makeup as the reference beam in step (c).

15. The method according to claim 13 wherein the reconstruction beam is directed through the photohardenable layer before striking the blazed surface.

16. The imaging method according to claim 13 wherein said object modulated beam and said reference beam are collimated beams.

17. An imaging method comprising the steps of:
 a. coating a slurry comprising a finely ground transparent material mixed with a photoresist on a transparent substrate, said coating forming a randomly varying photohardenable layer on said substrate;
 b. directing an object modulated beam of coherent radiation at one face of said layer; and
 c. directing a reference beam of coherent radiation, in phase with the coherent radiation of said object modulated beam, at the other face of said layer to create a standing wave interference pattern in and at the exposed face of said layer to create a corresponding change in and at said exposed face of said layer in resistance to a solvent.

18. An imaging method according to claim 17 including the additional step of subjecting said exposed face of said layer to a solvent for the relatively less hardened portions of said layer to create thereon a blazed photohardenable layer surface.

19. A method of reconstructing a hologram produced according to claim 18 comprising the step of:
 a. directing a reconstruction beam of coherent radiation at substantially the same direction relative to the blazed surface as the direction of the image construction reference beam relative to the photohardenable layer.

20. A reconstruction imaging method according to claim 19 wherein the reconstruction beam is similar in wavelength and wave front curvature to the image construction reference beam.

21. An imaging method comprising the steps of:
 a. coating a photohardenable layer on a randomly varying surface;
 b. directing a first object modulated beam of coherent radiation at one face of said layer;
 c. directing a first reference beam of coherent radiation, in phase with and similar in wavelength and wave front curvature to the image modulated beam, at the other face of said layer to create a standing wave interference pattern in and at the exposed face of said layer to create a corresponding change in and at the exposed face of said layer in resistance to a solvent; and
 d. repeating steps (b) and (c) above at least once with at least a second object modulated beam of coherent radiation and a second reference beam of coherent radiation.

22. An imaging method according to claim 21 including the additional step of subjecting said exposed face of said layer to a solvent for the relatively less hardened portions of said layer to create a blazed photohardenable layer surface thereon.

23. A method of reconstructing a hologram produced according to claim 22 comprising the step of:
 a. directing reconstruction beams of coherent radiation similar in wavelength and wave front curvature to the image construction reference beams at substantially the same direction relative to the blazed surface as the direction of the image construction reference beams relative to the photohardenable layer.

24. A method of reconstructing a hologram produced according to claim 22 comprising the step of:
 a. illuminating said blazed surface with a beam of white light to produce a multicolor image in direct relation to said image construction reference beams.

25. An imaging method comprising the steps of:
 a. coating a photohardenable layer on a transparent substrate;
 b. exposing said layer to a highly diffuse beam of ultraviolet light, developing said layer to thereby generate thereon a highly diffusing surface;
 c. directing an object modulated beam of coherent radiation at one face of said layer; and
 d. directing a reference beam of coherent radiation, in phase with the coherent radiation of said object modulated beam, at the other face of said layer to create a standing wave interference pattern in and at the exposed face of said layer to create a corresponding change in and at said exposed face of said layer in resistance to a solvent.

26. The method of reconstructing a hologram produced according to claim 1 comprising the step of:
 a. directing a white light source at said blazed surface thereby reconstructing the positive first order image without distortion while other images and wavelengths will be randomly diffused.

27. The method of reconstructing a hologram produced according to claim 3 comprising the step of:
 a. directing a white light source at said blazed surface thereby reconstructing the positive first order image without distortion while other images and wavelengths will be randomly diffused.

28. A hologram image construction method comprising the steps of:
 a. first coating a photohardenable layer on a randomly varying surface, said layer forming an irregular surface conforming to the randomly varying surface upon which it is coated;
 b. second coating said photohardenable layer with a material having the same index of refraction as said photohardenable layer, said coating conforming to the randomly varying surface of said photohardenable layer and having a nonrandomly relieved exposed surface;
 c. directing an object modulated beam of coherent radiation at one face of said photohardenable layer;
 d. directing a reference beam of coherent radiation, in phase with the coherent radiation of said object modulated beam, at the other face of said layer to create a standing wave pattern in and at the face of said photohardenable layer in contact with said second coating thereon to create a corresponding change at said face of said photohardenable layer in resistance to a solvent;
 e. removing said second coating to expose said photohardenable layer; and
 f. subjecting said exposed photohardenable layer to a solvent for the relatively less hardened portions of said layer to create a blazed photohardenable layer surface.

29. A method of reconstructing a hologram produced according to claim 28 comprising the steps of:
 a. coating said blazed photohardenable layer with a material having the same refractive index as said photohardenable layer prior to the subjecting of said photohardenable layer to a solvent and having a nonrandomly relieved exposed surface, and
 b. directing a reconstruction beam of coherent radiation through said coating at the blazed surface of said photohardenable layer.

30. The method of reconstructing a hologram produced according to claim 28 comprising the step of:
 a. directing a reconstructing beam of coherent radiation at substantially the same direction relative to the blazed photohardenable layer as the direction of the reference beam was relative to the photohardenable layer.

* * * * *